(12) United States Patent
Cheng (10) Patent No.: US 10,777,265 B2
(45) Date of Patent: Sep. 15, 2020

(54) ENHANCED FDSOI PHYSICALLY UNCLONABLE FUNCTION

(71) Applicant: INTERNATIONAL BUSINESS MACHINES CORPORATION, Armonk, NY (US)

(72) Inventor: Kangguo Cheng, Schenectady, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/810,993

(22) Filed: Nov. 13, 2017

(65) Prior Publication Data

US 2019/0147948 A1 May 16, 2019

(51) Int. Cl.
| | |
|---|---|
| *G11C 11/56* | (2006.01) |
| *G11C 11/419* | (2006.01) |
| *G11C 16/26* | (2006.01) |
| *G11C 7/24* | (2006.01) |
| *H04L 9/32* | (2006.01) |
| *G11C 7/10* | (2006.01) |
| *H01L 27/11519* | (2017.01) |
| *H01L 27/11526* | (2017.01) |

(52) U.S. Cl.
CPC ........ *G11C 11/5642* (2013.01); *G11C 7/1006* (2013.01); *G11C 7/24* (2013.01); *G11C 11/419* (2013.01); *G11C 16/26* (2013.01); *H04L 9/3278* (2013.01); *H01L 27/11519* (2013.01); *H01L 27/11526* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 6,906,962 | B2 | 6/2005 | Layman et al. |
| 7,402,855 | B2 | 7/2008 | Kurjanowicz |
| 7,688,648 | B2 | 3/2010 | Kim |
| 9,660,806 | B2 | 5/2017 | Haensch et al. |
| 9,947,391 | B1 * | 4/2018 | Mahatme ............ G11C 11/419 |
| 2015/0058928 | A1 * | 2/2015 | Guo ..................... H04L 63/08 |
| | | | 726/3 |
| 2016/0315611 | A1 * | 10/2016 | Rana ................. H01L 27/1203 |
| 2017/0063543 | A1 | 3/2017 | Haensch et al. |

FOREIGN PATENT DOCUMENTS

CN 106356340 A 1/2017

OTHER PUBLICATIONS

Mansouri, S. et al., "Ring Oscillator Physical Unclonable Function with Multi Level Supply Voltages" arXiv:1207.4017 (Jul. 2012) pp. 1-7.

* cited by examiner

*Primary Examiner* — Bo B Jang
(74) *Attorney, Agent, or Firm* — Tutunjian & Bitetto, P.C.; L. Jeffrey Kelly (57) ABSTRACT

An integrated circuit includes transistor devices, each having a back gate. A controller is connected to the back gate to apply voltages to the back gate, wherein a first mode includes a first voltage for operational threshold voltages for the transistor devices, and a second mode includes a second voltage that enhances threshold voltage variability of the plurality of transistor devices to provide a physically unclonable function (PUF) for chip identification.

17 Claims, 6 Drawing Sheets

ENHANCED FDSOI PHYSICALLY UNCLONABLE FUNCTION

BACKGROUND

Technical Field

The present invention relates to physically unclonable function (PUF) semiconductor devices, and more particularly to PUF devices that employ process variation to create a unique security identifier and circuits employing the same.

Description of the Related Art

Chip authentication is becoming increasingly more important for cloud and mobile applications. Chip authentication should ideally be difficult to attack, randomly generated and low cost. One method for providing improved security may include a physically unclonable function (PUF) for chip authentication. PUF is a physical entity that is embodied in a physical structure and is easy to evaluate but difficult to predict. A PUF device needs to be easy to fabricate but nearly impossible to duplicate, even given an exact manufacturing process employed to make the device. Conventional approaches for implementing PUF require additional process steps and thus increase process cost/complexity.

SUMMARY

In accordance with an embodiment of the present invention, an integrated circuit includes transistor devices, each having a back gate. A controller is connected to the back gate to apply voltages to the back gate, wherein a first mode includes a first voltage for operational threshold voltages for the transistor devices, and a second mode includes a second voltage that enhances threshold voltage variability of the plurality of transistor devices to provide a physically unclonable function (PUF) for chip identification.

Another integrated circuit includes a fully depleted semiconductor-on-insulator substrate (FDSOI) having a back gate formed below a buried dielectric layer of the FDSOI substrate, the FDSOI substrate including a semiconductor layer forming source regions, channel regions and drain regions. A front gate structure is formed on the semiconductor layer to form field effect transistors. A controller is connected to the back gate to apply voltages to the back gate of the field effect transistors, wherein a first mode includes a first voltage for operational threshold voltages for the field effect transistors and a second mode includes a second voltage that enhances threshold voltage variability of the field effect transistors to provide a physically unclonable function (PUF) for chip identification.

A method for applying a physically unclonable function (PUF) to an integrated circuit includes forming field effect transistors on a fully depleted semiconductor-on-insulator substrate (FDSOI) having a back gate formed below a buried dielectric layer of the FDSOI substrate, the FDSOI substrate including a semiconductor layer forming source regions, channel regions and drain regions; and controlling the back gate to apply voltages to the back gate of the field effect transistors, wherein a first mode includes a first voltage for operational threshold voltages for the field effect transistors and a second mode includes a second voltage that enhances threshold voltage variability of the field effect transistors to provide a physically unclonable function (PUF) for chip identification.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In accordance with aspects of the present invention, methods and structures are provided for fully depleted semiconductor-on-insulator (SOI) (FDSOI) devices with ultra-thin body and buried oxide (UTBB) SOI devices that offer a unique capability of back gating for performance improvement and power management. In one useful embodiment, UTBB chips are employed to provide physically unclonable function (PUF) authentication. The present embodiments employ methods and structures for forming UTBB FDSOI chips with PUF.

FDSOI technology has become a true complementary metal oxide semiconductor (CMOS) option. An advantage of FDSOI technology is its intrinsic low device variability because FDSOI transistors have undoped channels and thus eliminate a random dopant fluctuation (RDF). This has advantages in general, but one drawback includes that the PUF needs large enough device variability to ensure sufficient operability windows for PUF.

Due to intrinsic transistor variation, the frequency of multiple ring oscillators (RO) may differ even when they are manufactured by the same processes and on the same chip. The variation in RO frequency is random and hard to replicate, rendering RO a good candidate for PUF. In bulk transistor technology, the major transistor variation source is random dopant fluctuation (RDF). However, in FDSOI, RDF is eliminated owing to its undoped channel.

Aspects of the present invention provide methods and structures for forming PUF on FDSOI technology by using forward back bias to intentionally enhance the variability of PUF transistors and thus to improve the PUF operation window. FDSOI transistors that include low variability (e.g., for static random access memory (SRAM) applications), reverse back bias can be employed to reduce the variability. By doing so, the present embodiments enable PUF in FDSOI technology while maintaining the low variability advantages in logic, SRAM, and analog applications.

In useful embodiments, the structures can take advantage of unique features of FDSOI, for example, threshold voltage (Vt) variation induced by SOI thickness, Vt sensitivity on back gate bias depending on SOI thickness and Vt variability intentionally increased for FDSOI RO to enable FDSOI PUF. FDSOI PUF is compatible with FDSOI processing and at no extra cost. PUF circuits do not interfere or impact other FDSOI circuits on the device.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements may be included in the compound, and still function in accordance with the present principles. The compounds with additional elements will be referred to herein as alloys.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
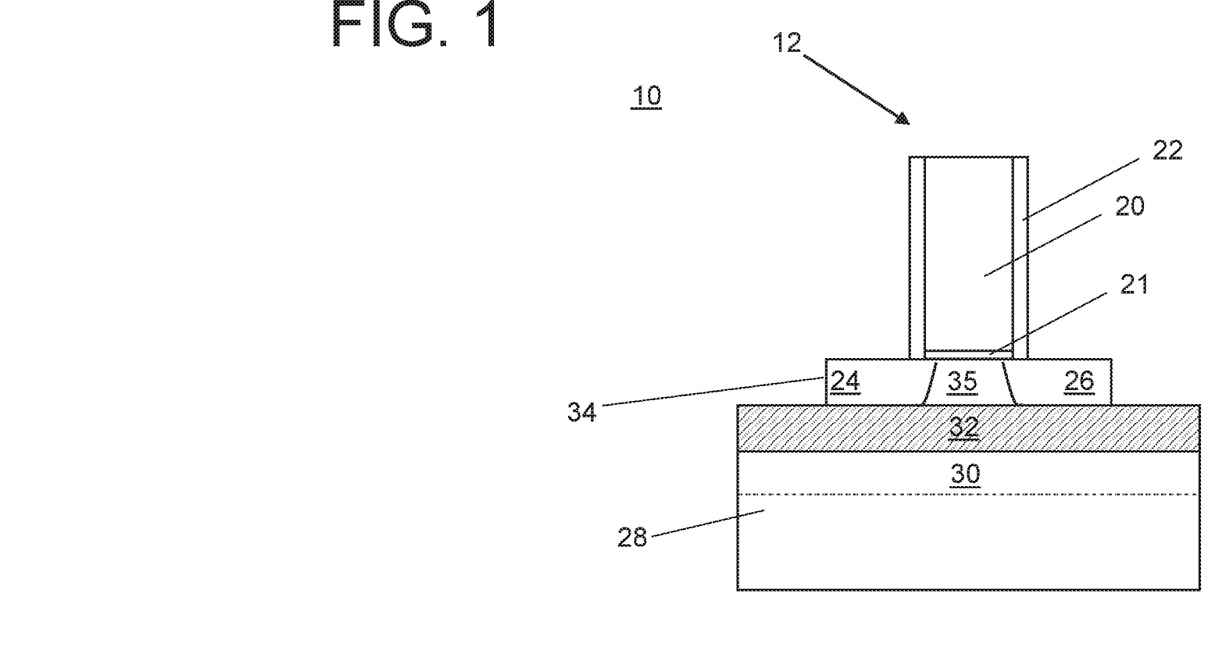
FIG. 1 is a cross-sectional view showing a semiconductor device having a back gate formed in a full depleted semiconductor on insulator substrate in accordance with one embodiment.

Referring now to the drawings in which like numerals represent the same or similar elements and initially to FIG. 1, a cross-sectional view of a field effect transistor (FET) device 10 is illustratively depicted in accordance with the present principles. Device 10 represents an illustrative configuration where a back gate 30 is formed from a base or main substrate 28 of a semiconductor-on-insulator (SOI) structure). The device 10 is depicted on a SOI structure, and preferably a FDSOI substrate, although other structures may be employed. The device 10 includes a front gate structure 12 that traverses a source region 24 and a drain region 26. The front gate structure includes a gate dielectric and one or more gate conductor materials.

The device 10 may be a FDSOI substrate that includes the base substrate 28 with the back gate 30, a buried dielectric layer 32 and a semiconductor layer 34. The substrate 28 may include a monocrystalline material, such as, e.g., Si, SiGe, Ge, GaAs, etc. In some embodiments, the back gate 30 may include a doped region (referred to as a doped well) formed within the substrate 28. Dopants in the doped well can be n-type or p-type. The non-limiting doping concentration of the back gate 30 can range from, e.g., about $1\times10^{17}$ cm$^{-3}$ to about $1\times10^{21}$ cm$^{-3}$. The buried dielectric layer 32 may include a buried oxide (BOX) layer, although any suitable dielectric material may be employed. The non-limiting thickness range of the buried dielectric layer 32 can be between, e.g., about 5 nm to about 25 nm. The thin semiconductor layer 34 may include crystalline Si, although other suitable materials may be employed, e.g., SiGe, SiC, Ge, GaAs, etc. The non-limiting thickness range of the thin semiconductor layer 34 can be between, e.g., about 3 nm to about 10 nm. The semiconductor layer 34 includes source and drain regions 24, 26, respectively formed therein. A region between the source region 24 and the drain region 26 includes a channel region 35 formed below the gate structure 12.

The semiconductor layer 34 forms the thin channel region 35 between the source and drain regions 24, 26. The channel conducts when a threshold voltage is present on the gate structure 12. The gate structure 12 includes a gate conductor 20 formed on a gate dielectric 21 or gate oxide (GOX). The gate conductor 20 includes conductive materials, such as, e.g., polycrystalline or amorphous silicon, germanium, silicon germanium, a metal (e.g., tungsten, titanium, tantalum, ruthenium, zirconium, cobalt, copper, aluminum, lead, platinum, tin, silver, gold), a conducting metallic compound material (e.g., tantalum nitride, titanium nitride, tungsten silicide, tungsten nitride, ruthenium oxide, cobalt silicide, nickel silicide), carbon nanotube, conductive carbon, graphene, or any suitable combination of these materials. The conductive material may further include dopants that are incorporated during or after deposition. The gate structure 12 includes spacers 22 on lateral sides. The spacers 22 may include a nitride material, although other suitable dielectric materials may be employed. The gate structure 12 may include a dielectric cap (not shown) on top of the gate structure 12.

The device 10 can include additional structures omitted for simplicity. These additional structures can include an interlevel dielectric (ILD) material deposited over the source region 24, the drain region 26 and the gate structure 12. Contact openings can be patterned into the ILD, filled with conductive material and planarized to form source/drain (S/D) contacts. The contacts may include any suitable conductive material, such as copper, aluminum, tungsten, etc. The contacts are formed to land on the source region 24, the drain region 26, the front gate 20 and the back gate 30.

In accordance with aspects of the present invention, a FDSOI back bias sensitivity as a function of SOI thickness can be employed as a physical unclonable feature. Back bias sensitivity can be defined as a ratio between threshold voltage (Vt) change and back bias. Back bias (or back gating, body bias, substrate bias, etc.) refer to techniques for dynamically adjusting the threshold voltage using a terminal (back gate 30). In some embodiments, the back gate 30 is connected to the substrate (or body). In other embodiments, the back gate 30 is electrically isolated from the substrate 28 (for example, the back gate can be n-type doped while the substrate is p-type doped so that the back gate is electrically isolated from the substrate by p-n junction). The back bias (with respect to the source region 24) can vary the threshold voltage of the device 10, which, in turn, impacts leakage current and performance of the device 10. The back bias can be adjusted in a positive manner or in a negative manner to influence threshold voltage. For NFETs, positive (or forward) back bias reduces threshold voltage (Vt) and negative (or reverse) back bias increases Vt. For PFETs, positive back bias increases Vt and negative back bias reduces Vt.

For example, a 6 nm thick semiconductor layer 34 of a SOI substrate, a buried dielectric (BOX) thickness of 20 nm and a gate length of 25 nm, Vt change is about 80 mV per 1V change of back bias. Different SOI channel thicknesses have different sensitivity to back bias. The thicker the SOI layer 34, the more Vt shift. In other words, for an NFET, negative back bias reduces the SOI thickness of layer 34 induced Vt variation while positive back bias enhances the SOI thickness induced Vt variation.

Figure 2:
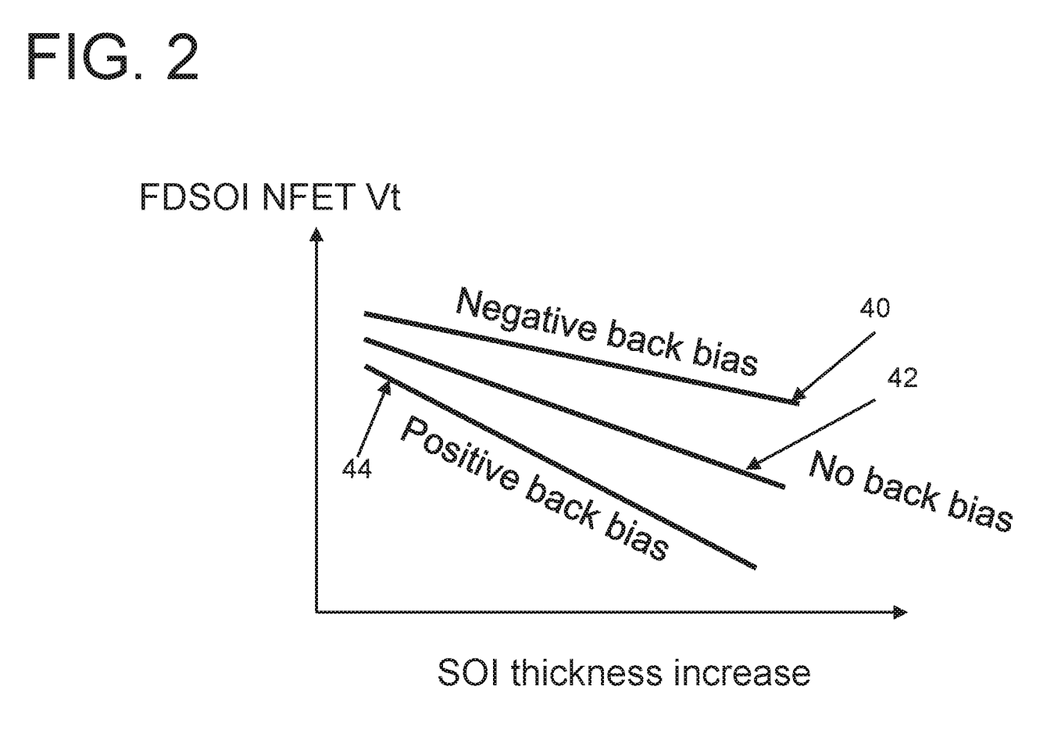
FIG. 2 is a graph showing threshold voltage versus semiconductor-on-insulator (SOI) thickness increase for a negative, positive and no back bias of the back gate in accordance with one embodiment.

Referring to FIG. 2, a graph shows threshold voltage of a FDSOI NFET plotted against SOI thickness increase (e.g., of layer 34 (FIG. 1)). A first trace 40 shows negative back bias. A second trace 42 shows no back bias. A third trace 44 shows positive back bias. The back bias decreases at different rates for each trace, but threshold voltage decreases with layer 34 thickness.

Figure 3:
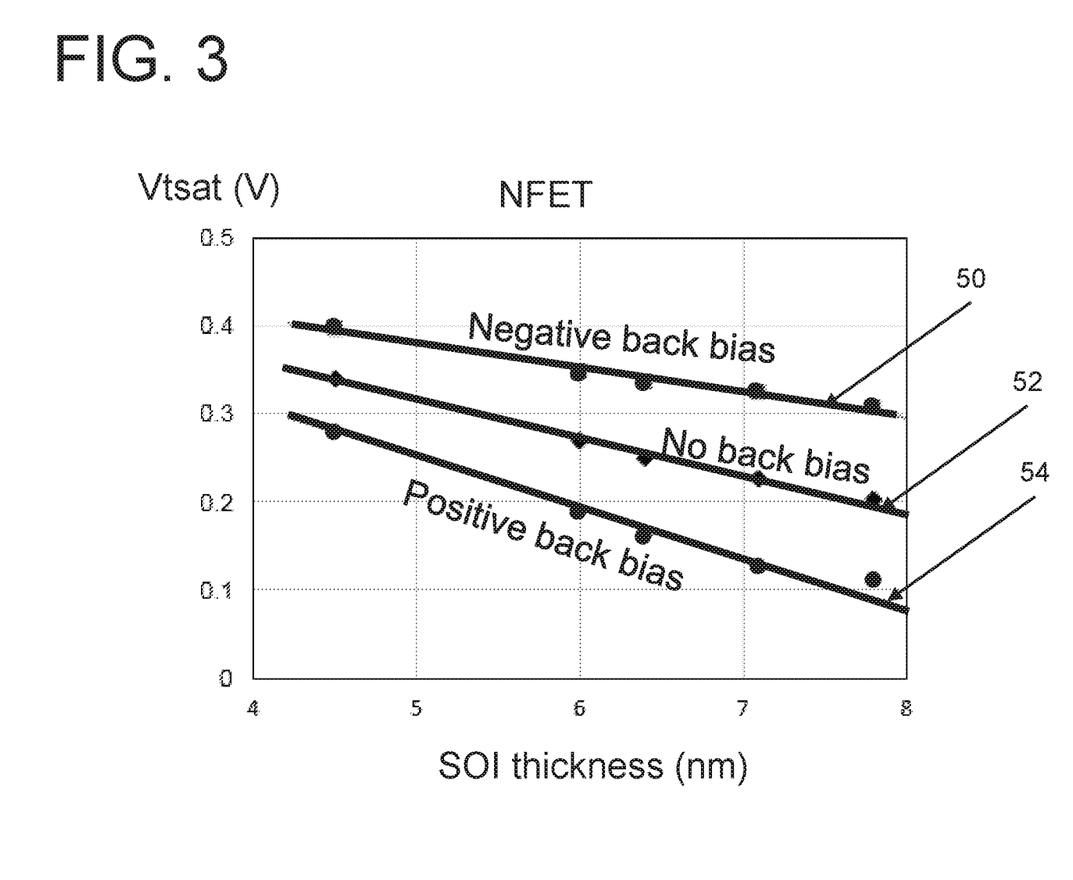
FIG. 3 is a graph showing saturation threshold voltage ($V_{Tsat}$) versus SOI thickness for an NFET showing threshold voltage variability with respect to thickness for a negative, positive and no back bias of the back gate in accordance with one embodiment.
Figure 4:
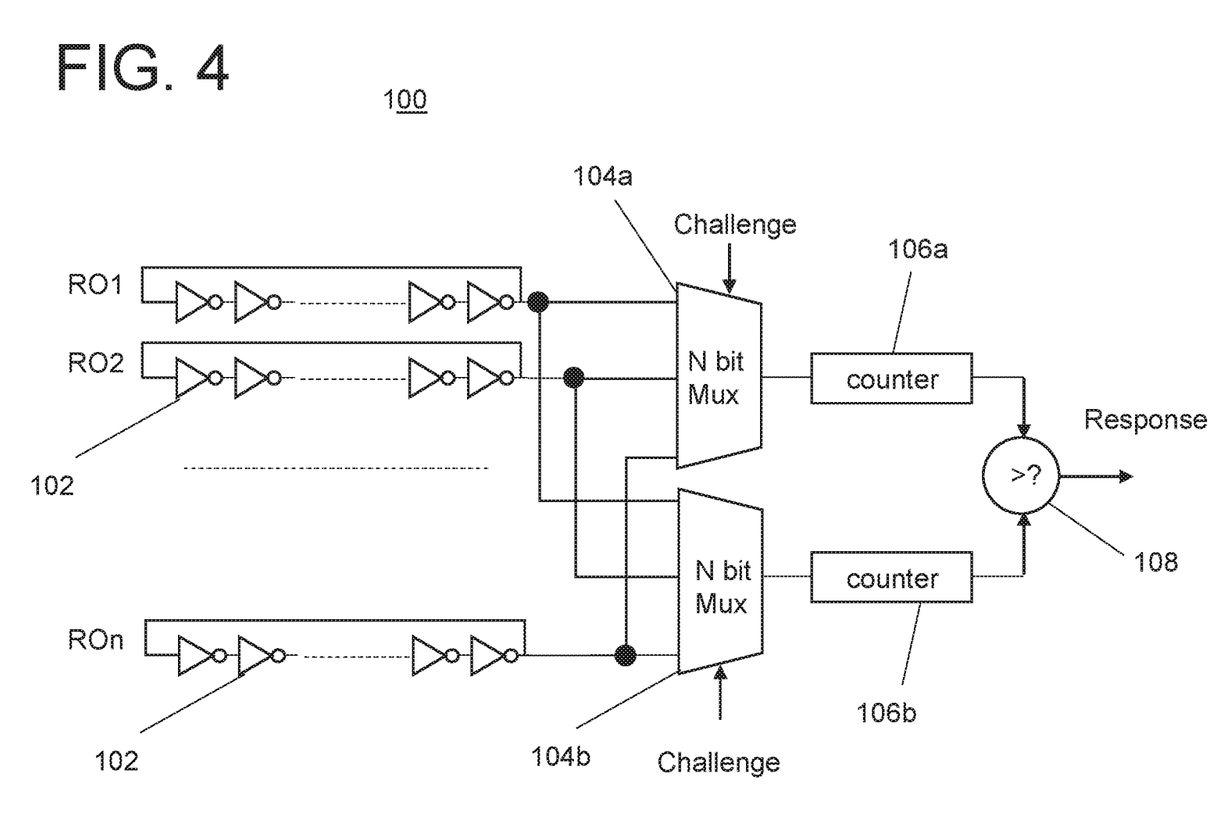
FIG. 4 is a schematic diagram showing a ring oscillator circuit for which a physically unclonable function can be applied in accordance with embodiments of the present invention.

Referring to FIG. 3, a plot of experimental data for an NFET is shown. The experimental data shows saturation threshold voltage $V_{Tsat}$ (V) plotted against SOI thickness (nm) to illustratively demonstrate induced Vt variation that can be enhanced or reduced depending on back bias polarity. A first trace 50 shows negative back bias. A second trace 52 shows no back bias. A third trace 54 shows positive back bias. As shown in FIG. 4, with negative back bias 50, the Vt difference between 3.5 nm SOI channel thickness and 7.7 nm SOI channel thickness is about 100 mV. With positive back bias 54, the Vt difference increases to 170 mV. Clearly, for an NFET, negative/positive back bias reduces/enhances Vt variation. Similarly, for PFETs, negative/positive back bias enhances/reduces Vt variation.

Unclonability means that each PUF device has a unique and unpredictable way of mapping challenges to responses, even if it was manufactured with the same process as a similar device, and it is infeasible to construct a PUF with the same challenge-response behavior as another given PUF because exact control over the manufacturing process is infeasible. The challenge can mapped based on the logic states (e.g., 1's and 0's). Given the design of the PUF system, without knowing all of the physical properties of the random components, the logic state arrangement is highly unpredictable. These PUF properties can be employed as a unique and untamperable device identifier.

Referring to FIG. 4, while the present embodiments may apply to any device structure, the present illustrative example shows a SOI metal-oxide-semiconductor field effect transistor (MOSFET) device configured for use as a ring oscillator (RO) circuit 100. The circuit 100 can include a plurality of ring oscillators, RO1, RO2 . . . ROn. Each ring oscillator RO1, RO2, etc. includes a chain of one or more inverters 102. The ring oscillators RO1, RO2 . . . ROn have an output connected to a logic gate or a multiplexer 104a, 104b. The multiplexers 104a, 104b multiplex N bits to one where N is the number of ring oscillators connected to the input of each multiplexer 104a 104b. The output of each ring oscillator RO is input to each of the two multiplexers 104a and 104b.

It should be understood that while ring oscillators and multiplexers are illustratively shown, other embodiments may include other circuits and components that measure data variability due to PUF techniques. For example, logic gates can be employed with inverter strings, memory cells with access transistors, etc.

In the embodiment shown, a challenge 106 can be issued to each multiplexer 104a and 104b to evoke a response 108. The challenge 106 can include an enable signal to permit data to move through the circuit 100. In other embodiments, the challenge 106 can include a signal to enable the multiplexers 104a, 104b to output a particular sequence of data. Other challenges can include bit sequences or duration information, a sequence range to be checked or other operations suitable for uniquely identifying the chip or device.

In one example, counters 106a and 106b can be employed to count bits in the data sequences output, respectively, from the multiplexers 104a and 104b. The counters 106a and 106b can have their results compared and the comparison of the results of the counters 106a and 106b can be further processed or compared in a response component 108 to determine the identity of the chip or the device, on which the circuit 100 is formed. The circuit 100 can be identified or verified in this way.

The response component 108 can include comparators, logic gates or even include off-chip components or software (on-chip or off-chip). The response components 108 can be hardwired to compare the result or be programmable in accordance with the challenge presented. It should be understood that many challenge-response scenarios are contemplated in accordance with the present embodiments. The logic states of the transistors 110, 112 (FIGS. 5, 6) will determine the pattern for PUF.

Figure 5:
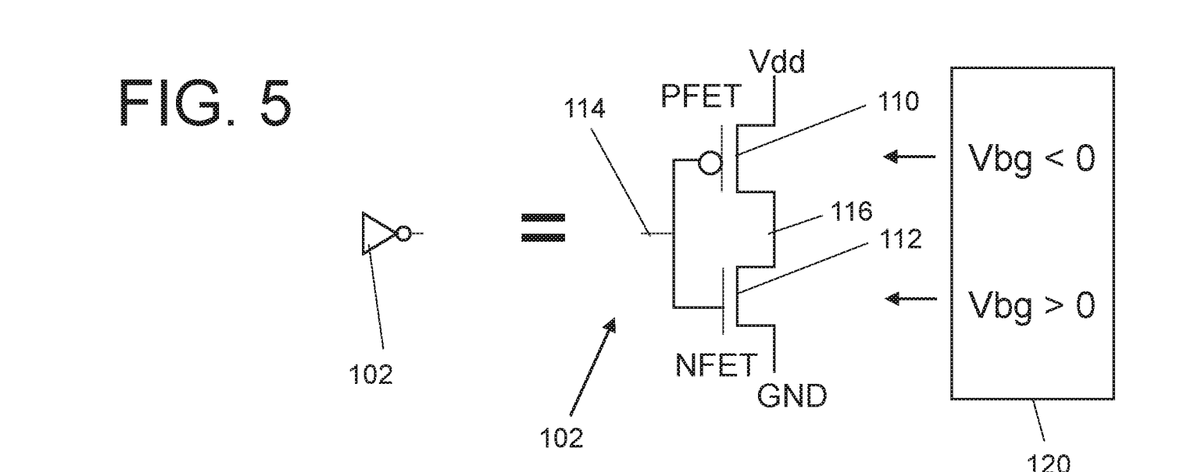
FIG. 5 is a schematic diagram showing an inverter having a back gate controlled by a back gate controller to enhance threshold voltage variability for the physically unclonable function in accordance with embodiments of the present invention.

Referring to FIG. 5, the inverters 102 are shown in greater detail. Each inverter 102 includes a PFET 110 and an NFET 112. Gates of the NFET 112 and the PFET are connected to each other at an input 114 of the inverter 102. The PFET 110 is connected to supply voltage (Vdd) and the NFET is connected to ground (GND). A common node 116 is the output of the inverter 102. The inverter 102 inverts the input at its output turning bit 1's to bit 0's and vice versa.

Figure 6:
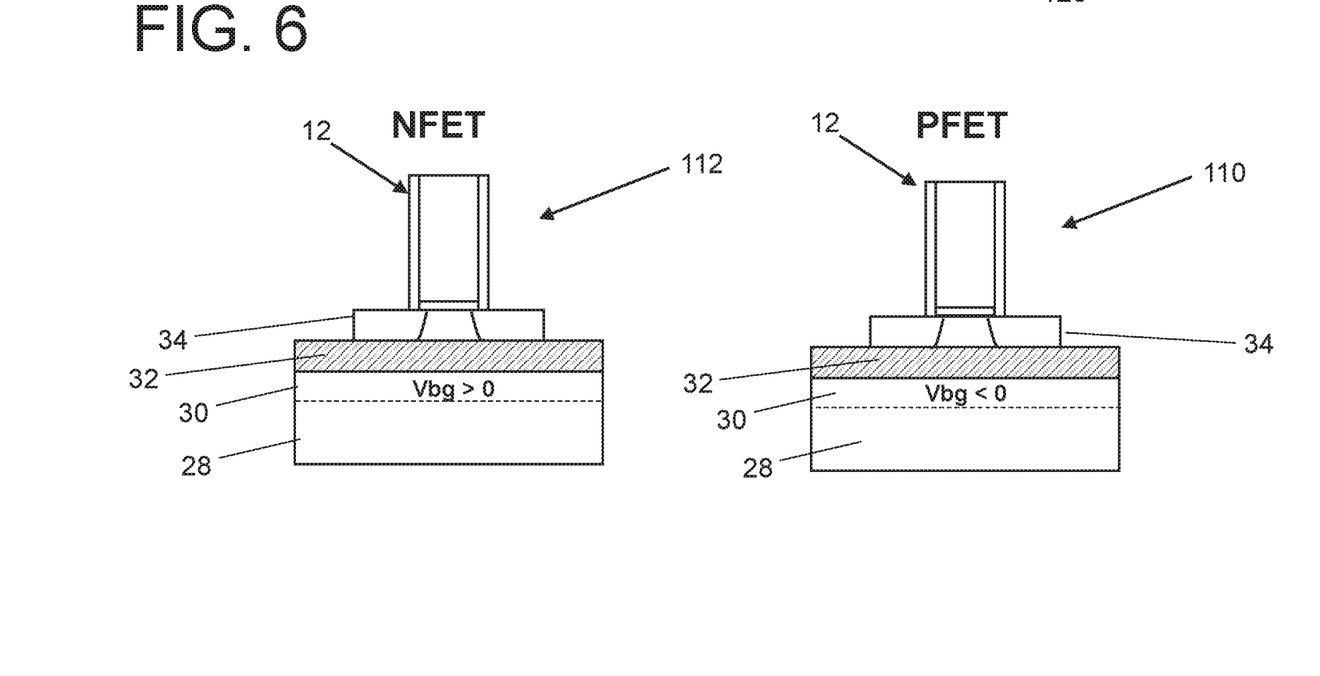
FIG. 6 is a cross-sectional view showing an NFET and a PFET having a back gate controlled by a back gate controller to enhance threshold voltage variability in accordance with embodiments of the present invention.

Referring to FIG. 6 with continued reference to FIG. 5, back gate voltage (Vbg) can be controlled by a back gate voltage controller 120 to provide and enhance threshold voltage variability in accordance with the present embodiments. The back gate voltage controller 120 can control voltages on one or more regions of the back gate 30. The back gate voltage controller 120 can include circuitry configured to control Vbg depending on the mode of operation or other factors. For example, the NFET 112 can employ a positive back gate bias (e.g., Vbg>0) to enhance Vt variability due to SOI thickness variation of layer 34. Similarly, the PFET 110 can employ a negative back gate bias (e.g., Vbg<0) to enhance Vt variability due to SOI thickness variation of layer 34. These voltages can be applied together, individually or separately in a sequence. In some embodiments, the thickness of the buried dielectric layer 32 can be 20 nm, then, a back gate voltage of 1V can be applied to NFET 112 and a back gate voltage of −1V can be applied to PFET 110 for the PUF circuits.

The Vbg may be applied uniformly across the entire device or may be applied differently in different sections, as needed or desired. The back gate structure can form PUF on FDSOI technology by using forward back bias to intentionally enhance the variability of PUF transistors and thus to improve PUF operation window. In such a case, for FDSOI transistors that need low variability (e.g., for SRAM applications), reverse back bias can be employed to reduce the variability during operations.

In this way, a wide PUF window in FDSOI technology can be maintained using a first back gate voltage and a low variability can be maintained in logic, SRAM, and analog applications using a different back gate voltage. Aspects of the present invention can take advantage of two unique features of FDSOI, namely, Vt variation induced by SOI thickness and Vt sensitivity on back gate bias depending on SOI thickness. In this way, intentionally increasing Vt variability of FDSOI RO, to enable FDSOI PUF can be provided by controlling back gate voltage (Vbg). Since the back gate voltage is compatible with FDSOI processes, FDSOI PUF can be achieved at no extra cost, and the PUF circuitry does not impact or interfere with other FDSOI circuits on the device.

Since the thickness variation can be employed to uniquely identify a device or chip, processing can be employed to treat, e.g., layer 34 using a lithography pattern and etch or a process that creates thickness variations in layer 34 across the device. In this way, predetermined or random variations can be created across the chip and permit for PUF. Other methods and processes can also be employed that take advantage of the FDSOI structure and characteristics. Other structures other than FDSOI can also be employed in accordance with the present embodiments.

The variations of the devices and/or their locations can provide an authentication key or keys that will differ in subsequently manufactured chips due to variations in a manufacturing process or processes. In one example, the chip employs thickness variations in layer 34 to generate its key. In another example, the chip can employ threshold voltage variations in transistors across the chip to generate its key. These threshold voltage variations in transistors can be enhanced by controlled back gate voltage.

In useful embodiments, a PUF array of FETs or a PUF circuit using FETs (e.g., a ring oscillator circuit, etc.) can be formed in a particular area or may be distributed across the chip. PUF arrays and circuits are preferably fabricated using a same process as other devices on the chip. This results in no extra process costs.

The location (address) of each device can provide useful information for the physically unclonable function (PUF) for the array. In one embodiment, the FDSOI chip with on-chip PUF permits the chip, integrated circuit or array to be identified in or by computers, network systems, etc. for authentication of the chip, integrated circuit or array. In one embodiment, a threshold voltage variability pattern of the field effect transistors (provided using, e.g., logic states) can provide the information for identifying and/or authenticating an integrated circuit or chip.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
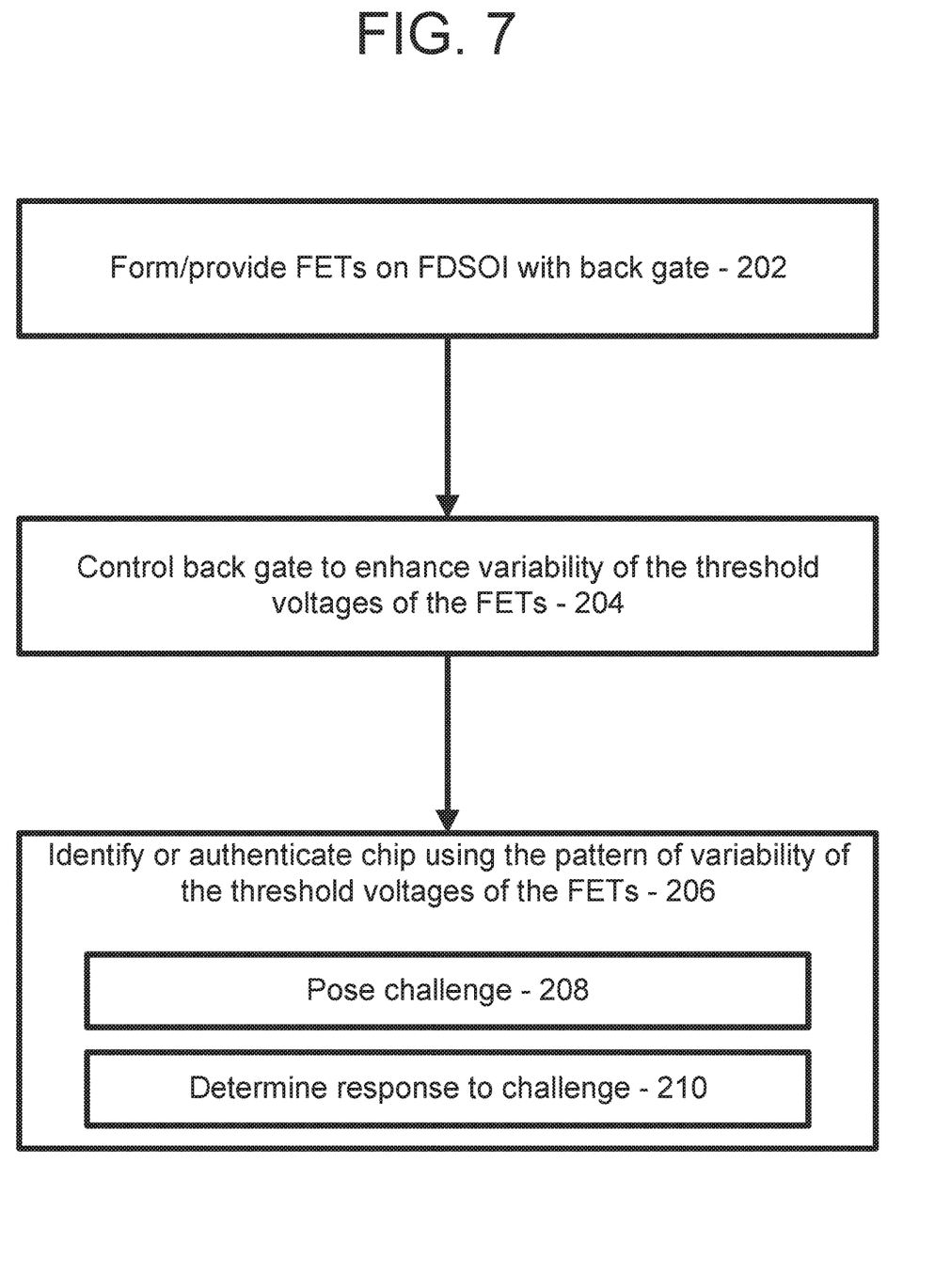
FIG. 7 is a block/flow diagram showing methods for applying a physically unclonable function to an integrated circuit in accordance with the present principles.

Referring to FIG. 7, methods for applying a physically unclonable function (PUF) to an integrated circuit are described in accordance with the present invention. The methods employ variability in the fabrication and/or operation of transistor devices. While the present principles will be described in terms of threshold voltage variability, it should be understood that other structures and features may be employed to provide the PUF capabilities. The integrated circuit may include a fully depleted semiconductor-on-insulator substrate.

In block 202, field effect transistors are formed on a fully depleted semiconductor-on-insulator substrate (FDSOI) (or other substrate) having a back gate formed below a buried dielectric layer of the FDSOI substrate. The FDSOI substrate includes a semiconductor layer forming source regions, channel regions and drain regions. The semiconductor thickness can be employed to induce variability based upon the back gate voltage (bias) applied thereto.

In block 204, the back gate is controlled to apply voltages to the back gate of the field effect transistors. A first mode includes a first voltage for operational threshold voltages for the field effect transistors. In this mode, a low variability of the threshold voltage can be maintained to have consistent device operation across the chip. A second mode includes a second voltage that enhances threshold voltage variability of the field effect transistors to provide a physically unclonable function (PUF) for chip identification. The variability can be employed to uniquely identify the chip. In other words, the threshold voltage of each transistor can be measured and employed to identify a pattern at a given voltage. This pattern acts as a sort of fingerprint for the integrated circuit or chip. This pattern can be identified using circuitry (RO circuit), imaging, recording values in a matrix, etc. In one example, the integrated circuit includes at least one ring oscillator.

In block 206, an identity of the integrated circuit is determined or authenticated using a threshold voltage variability pattern of the field effect transistors. An identity of the integrated circuit may be authenticated using the logic pattern by a computer system or other hardware device (e.g., a motherboard, a communication device, etc.). The logic pattern is known after the chip or circuit is complete (fabricated). This pattern may be employed as a fingerprint for the chip or circuit and may be employed in an authentication operation for the chip.

In some embodiments, in block 208, a challenge is posed to a circuit (e.g., to at least two multiplexers configured to receive input from the at least one ring oscillator). In block 210, a response is determined to the challenge for authentication of a chip.

In one example, the chip may be identified after its manufacture based on the logic pattern. The logic pattern will substantially be unique for each chip since the number of devices can be very large, and the threshold voltage variability will vary across each chip. The chip can then later be identified by reading out the logic pattern from the array of cells fabricated in accordance with the present invention.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Having described preferred embodiments for an enhanced FDSOI with on-chip physically unclonable function (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An integrated circuit, comprising:
a plurality of transistor devices each having a back gate that includes a region formed distinct from a body of each of the plurality of transistor devices; and
a controller connected to the back gate to apply voltages to the back gate, wherein the controller includes a first mode that includes a first voltage for operational threshold voltages for the plurality of transistor devices and a second mode that includes a second voltage that enhances threshold voltage variability of the plurality of transistor devices to provide a physically unclonable function (PUF) for chip identification.

2. The circuit as recited in claim 1, wherein the plurality of transistor devices includes field effect transistors having the back gate formed in a well of a semiconductor substrate.

3. The circuit as recited in claim 2, wherein the semiconductor substrate includes a fully depleted semiconductor-on-insulator substrate.

4. The circuit as recited in claim 1, wherein the circuit includes at least one ring oscillator.

5. The circuit as recited in claim 1, wherein the plurality of transistor devices includes n-type field effect transistors (NFETs) and the second voltage includes a positive back gate bias.

6. The circuit as recited in claim 1, wherein the plurality of transistor devices includes p-type field effect transistors (PFETs) and the second voltage includes a negative back gate bias.

7. The circuit as recited in claim 1, wherein the PUF for chip authentication includes a threshold voltage variability pattern of the plurality of transistor devices.

8. The circuit as recited in claim 7, wherein the PUF is employed by a computer system to authenticate an identity of the integrated circuit.

9. The circuit as recited in claim 1, wherein the back gate is electrically isolated from a body of each of the plurality of transistor devices.

10. An integrated circuit, comprising:
a fully depleted semiconductor-on-insulator substrate (FDSOI) having a back gate of field effect transistors that includes a region formed distinct from a body of each of the field effect transistors formed below a buried dielectric layer of the FDSOI substrate, the FDSOI substrate including a semiconductor layer forming source regions, channel regions and drain regions;
a front gate structure formed on the semiconductor layer to form the field effect transistors; and
a controller connected to the back gate to apply voltages to the back gate of the field effect transistors, wherein the controller includes a first mode that includes a first voltage for operational threshold voltages for the field effect transistors and a second mode that includes a second voltage that enhances threshold voltage variability of the field effect transistors to provide a physically unclonable function (PUF) for chip identification.

11. The circuit as recited in claim 10, wherein the field effect transistors include the back gate formed in a well of a base semiconductor substrate.

12. The circuit as recited in claim 10, wherein the circuit includes at least one ring oscillator.

13. The circuit as recited in claim 12, wherein the circuit includes:
   at least two multiplexers configured to receive input from the at least one ring oscillator and to receive a challenge; and
   a response component to determine a response to the challenge for authentication of a chip including the circuit.

14. The circuit as recited in claim 10, wherein the field effect transistors include n-type field effect transistors (NFETs) and the second voltage includes a positive back gate bias.

15. The circuit as recited in claim 10, wherein the field effect transistors include p-type field effect transistors (PFETs) and the second voltage includes a negative back gate bias.

16. The circuit as recited in claim 10, wherein the PUF for chip authentication includes a threshold voltage variability pattern of the field effect transistors.

17. The circuit as recited in claim 16, wherein the PUF is employed by a computer system to authenticate an identity of the integrated circuit.

\* \* \* \* \*